Aug. 16, 1960 W. CRAWFORD 2,948,984
FISH LURE
Filed Sept. 5, 1958

INVENTOR.
WALKER CRAWFORD
BY Patrick D. Beavers
ATTY.

United States Patent Office 2,948,984
Patented Aug. 16, 1960

2,948,984

FISH LURE

Walker Crawford, Rte. 1, Box 894, Belmont, N.C.

Filed Sept. 5, 1958, Ser. No. 759,228

1 Claim. (Cl. 43—42.39)

This invention relates to improvements in fish lures and more especially a spoon type fish lure that vibrates abnormally as it is retrieved through the water.

An object of this invention is, therefore, to provide a fish lure that vibrates to attract fish in a manner similar to the manner in which vibrations caused by a minnow swimming through the water will attract fish.

Science claims that fish do not hear sounds under water, but like deaf people, the fish are able to feel vibrations caused by other swimming fish. Since most large fish prey upon small fish for food, the vibrations caused by the small fish, serve as a dinner bell to call the fish to eat. Since the fish lure embodying the invention sets up vibrations that will attract fish, such fish lure provides a very effective means for catching large game fish.

Another object of this invention is to provide a fish lure that is adapted to be made of copper, stainless steel painted in any combination of colors and made in different sizes and weights, depending on the kind of fish desired to be caught or the type of fishing tackle being used.

With the above and other objects and advantages in view, this invention consists of the novel details of construction, arrangement and combination of parts more fully hereinafter described, claimed and illustrated in the accompanying drawing, in which:

Figure 1:
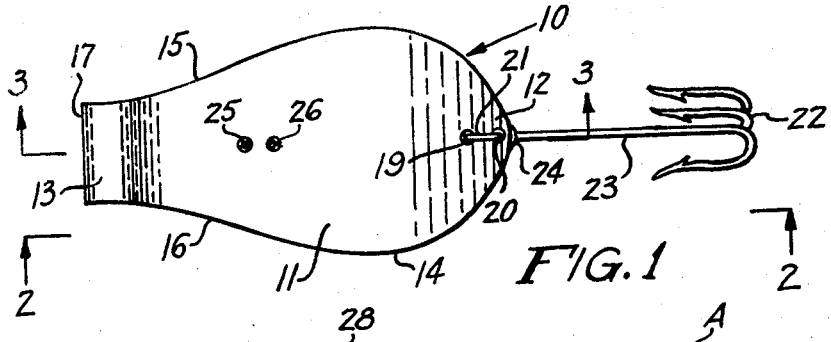
Fig. 1 is a plan view of a fish lure embodying the invention.
Figure 2:
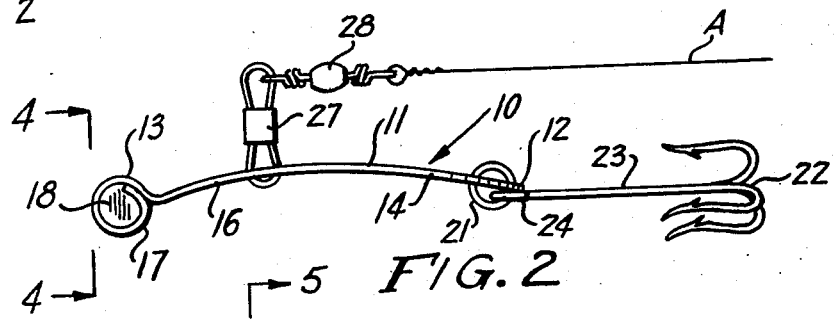
Fig. 2 is a side elevational view of Fig. 1, approximately on the line 2—2 of Fig. 1.
Figure 3:
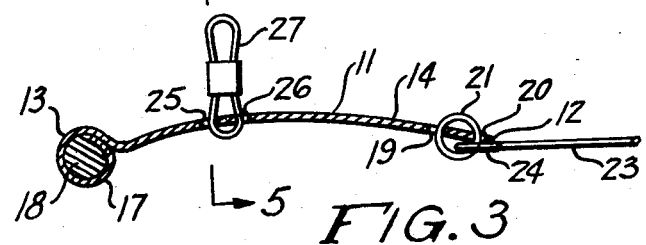
Fig. 3 is a longitudinal sectional view on the line 3—3 of Fig. 1.
Figure 4:
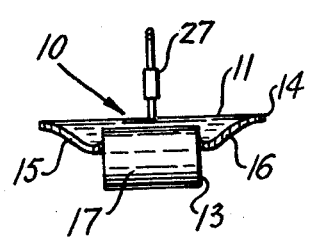
Fig. 4 is an end view on the line 4—4 of Fig. 2.
Figure 5:
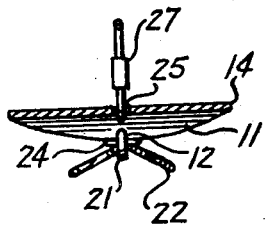
Fig. 5 is a vertical sectional view on the line 5—5 of Fig. 3.

Referring more in detail to the drawing, wherein like parts are designated by like reference numerals, the reference numeral 10 is used to designate a fish lure embodying the invention.

The fish lure 10 comprises a body 11 that has a curved tail portion 12 and a head portion 13.

The body 11 has an oval portion 14 that merges into the tail portion 12 and the body 11 tapers forwardly and inwardly from the oval portion 14 along the edges 15 and 16 into the head portion 13. The head portion 13 is curved upon itself to provide a circular portion 17 which is filled with a lead plug 18. The plug 18 forms a weight for the fish lure 10 so that as the lure is cast the head portion 13 will pull the body 11 downwardly and, as the lure is retrieved, the tail portion 12 will raise the head and at the same time impart an oscillatory motion to the lure.

The body 11 has a pair of alined openings 19 and 20 in the tail portion 12 into which is positioned a split ring 21. A gang hook 22 has a stem 23 on which is formed an eye 24. The eye 24 is positioned in relation to the tail portion 12 so that as the fish lure 10 is retrieved, the stem 23 will abut the tail portion 12 and prevent it from fouling the fish line to which the fish lure 10 is connected.

The body 11 is provided with a pair of alined openings 25 and 26 in which is positioned a snap connection 27 that is connected to a swivel 28 to which the fish line A is connected.

The openings 19, 20, 25 and 26 are positioned on the longitudinal axis of the fish lure 10 and the openings 25 and 26 are located at the point of balance of the fish lure 10.

In action the lead plug 18, acting as a weight, pulls the head portion 13 down and raises the tail portion 12 when cast, the body acting as an airfoil. When the lure is retrieved the action of the water on the downwardly curved tail serves to lower the tail and raise the head. The pressure of water on the tail portion 12 also causes the fish lure to vibrate according to the speed with which the fish lure 12 is retrieved. The vibrations of the fish lure 10 will be transmitted through the water to attract fish.

There has thus been provided a fish lure which is simple but effective in operation and it is believed that the construction and operation of the fish lure will be apparent to those skilled in the art, it is also to be understood that changes in the minor details of construction, arrangemen and combination of parts may be resorted to provided they fall within the spirit of the invention and the scope of the appended claim.

Having thus described the invention what is claimed as new and desired to be secured by Letters Patent is:

A fish lure comprising a body portion which is oval in outline, straight in transverse cross section, and arcuate in longitudinal cross section, the forward end of said body tapering inwardly and being rolled along the transverse axis to form a circular weight receiving portion, a lead plug in said weight receiving portion, said body having a first pair of aligned openings therein along its longitudinal axis adjacent its rear end, a gang hook having a stem and an eye on said stem, a ring in said first pair of openings engaging said eye whereby said stem engages the underside of the rear end of said body to limit movement of said gang hook in an upward direction, said body having a second pair of openings therein aligned with said first pair of openings at substantially the point of balance of said body, a snap connection engaged in one end in said second pair of openings, a swivel connected to the other end of said snap connector, and a line secured to said swivel.

References Cited in the file of this patent

UNITED STATES PATENTS

| | | |
|---|---|---|
| 1,598,958 | Crosby | Sept. 7, 1926 |
| 1,657,966 | Jordan | Jan. 31, 1928 |
| 2,246,850 | Housberg | June 24, 1941 |
| 2,315,304 | Upperman | Mar. 30, 1943 |